(No Model.)
H. GOODMAN.
PULLEY.
No. 290,572.  Patented Dec. 18, 1883.
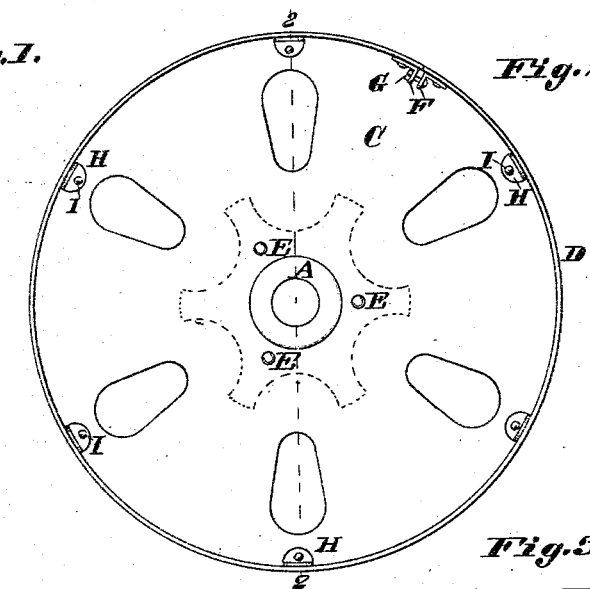
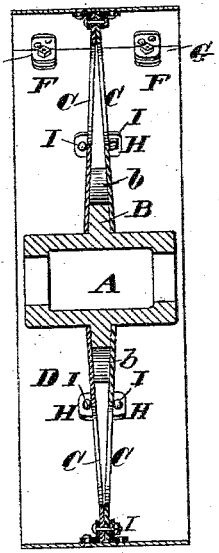
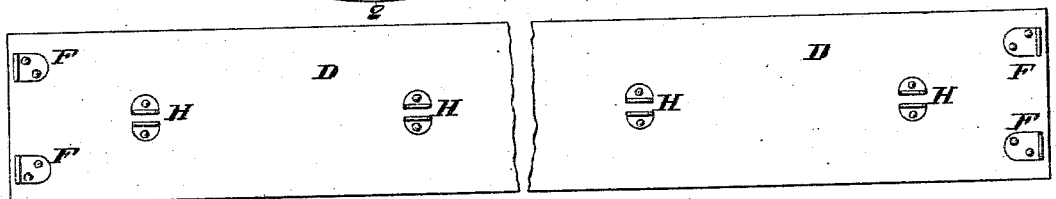
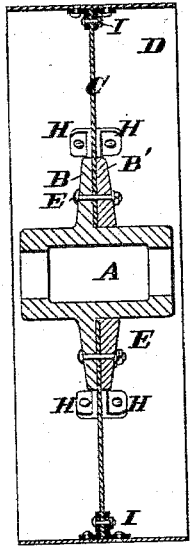
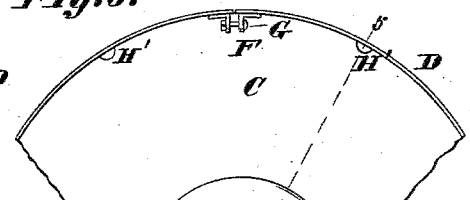
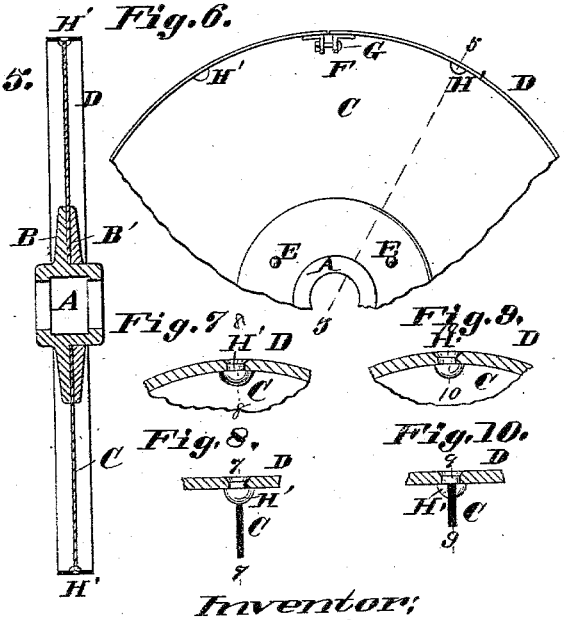
Attest:
Edw. E. Israel.
Geo. L. Wheelock.
Inventor:
Henry Goodman
By Knight Bros.
Attys.

UNITED STATES PATENT OFFICE.

HENRY GOODMAN, OF ST. LOUIS, MISSOURI, ASSIGNOR OF ONE-HALF TO DANIEL P. KANE, OF SAME PLACE.

PULLEY.

SPECIFICATION forming part of Letters Patent No. 290,572, dated December 18, 1883.

Application filed August 7, 1883. (No model.)

*To all whom it may concern:*

Be it known that I, HENRY GOODMAN, of the city of St. Louis, in the State of Missouri, have invented a certain new and useful Improvement in Pulleys, of which the following is a full, clear, and exact description, reference being had to the accompanying drawings, forming part of this specification.

Reference is made to the claims for statement of invention.

Figure 1 is a side view of the pulley. Fig. 2 is a section of same at 2 2, Fig. 1. Fig. 3 is an inside view of the pulley-band, a part being broken out. Fig. 4 is an axial section, showing a modification; and Fig. 5 is a similar section, showing a narrow pulley at 5 5, Fig. 6. Fig. 6 is a detail side view. Fig. 7 is a detail section at 7 7, Fig. 8. Fig. 8 is a section at 8 8, Fig. 7. Fig. 9 is a detail section at 9 9, Fig. 10; and Fig. 10 is a section at 10 10, Fig. 9.

The pulley, as shown in Figs. 1, 2, and 3, will be first described.

A is a cast-iron hub, having a central annular flange, B, decreasing in thickness outwardly.

$b$ are a number of bracing-fingers, projecting outward, forming braces to the disks C, that take the place of spokes or arms connecting the hub to the band D. These disks have a central orifice fitting the ends of the hub, and are formed to fit the hub and its flange B at the center. The disks are connected to the flange by bolts or rivets E. I prefer bolts to rivets, because when these are used it is an easy thing to change the hubs to suit shafts of various sizes without changing any other part of the pulley.

F are angle-lugs riveted to the ends of the band, and serving by the use of bolts G to connect the ends of the band together and draw it tight upon the periphery of the disks, C.

H are the angle-lugs, riveted to the band and fitting closely the sides of the disks C.

I are bolts or rivets, passing through a pair of the lugs and through the disks between them. All of the lugs may be thus connected to the disks, or only one or more pairs, the lugs giving the necessary lateral bracing without such connection, while the connection in one place insures that the band of the pulley shall not turn on the disks.

In the manufacture the band may be finished in one straight piece, (see Fig. 3,) and by application to the periphery of the disks (the same being exactly circular) will take a circular form, and will be supported in that form by contact with the disk all around, even if made of very thin sheet.

In Figs. 4 and 5 the pulley has a single plane disk, confined between the perpendicular sides of a fixed flange, B, and collar B' by bolts E, that pass through the disk C. The connection of the disk and rim or band D is similar to that described in connection with Figs. 1 and 2. The two parts B B' in Fig. 4 are about similar in form, taken together, to the single flange B of Figs. 1 and 2. In Fig. 5 the connection between the hub and the disk is precisely similar to that described in connection with Fig. 4; but the connection between the disk C and band is different. In this a number of rivets, H', are fixed in the band, with their heads projecting inwardly. The heads, except one, are notched through to receive the edge of the disk, the disk being recessed to fit the unnotched head for the purpose of preventing the band turning on the disk, while allowing the band to be drawn tight by the clamping device. The unnotched rivet is shown in Figs. 5, 6, 7, and 8, and the notched rivets in Figs. 5, 6, 9, and 10. The ends of the band are shown secured in the manner before described.

I claim—

1. In a pulley, the combination of a suitable hub, a disk, C, and a band provided with projections to embrace the edge of the disk, and clamping device F G, to draw the ends of the band together and hold it to the disk, as set forth.

2. In a pulley, the combination of a hub, a disk surrounding the hub, a band having projections embracing the edge of the disk, and angle-lugs F, secured to the ends of the band, and bolts G to connect the band ends together, as set forth.

3. In a pulley, the combination of a hub, a disk, C, surrounding said hub, having a notch in its edge, a band having projections to embrace the edge of the disk, and a projection to fit the notch in the disk to prevent it from turning, and angle-lugs F and bolts G to secure the ends of the band together, as set forth.

4. In a pulley, the combination of hub A, having flange B, decreasing in thickness outwardly, disks C, secured one on each side of the flange and meeting at their outer edges, a band having projections to embrace the edges of the disks, and angle-lugs and bolts to secure the ends of the band together, as set forth.

HENRY GOODMAN.

Witnesses:
SAML. KNIGHT,
EDW. E. ISRAEL.